(12) United States Patent
Jansson

(10) Patent No.: US 6,702,528 B2
(45) Date of Patent: Mar. 9, 2004

(54) INSERT HOLDER HAVING CONVEXLY CURVED SURFACE FOR SUPPORTING A CUTTING INSERT

(75) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/322,655

(22) Filed: Dec. 19, 2002

(65) Prior Publication Data

US 2003/0143040 A1 Jul. 31, 2003

(30) Foreign Application Priority Data

Dec. 21, 2001 (SE) .............................. 0104427

(51) Int. Cl.⁷ .............................................. B23B 29/04
(52) U.S. Cl. ........................... 407/102; 407/85; 407/87
(58) Field of Search ................................ 407/102, 103, 407/101, 85, 87, 40, 44, 47

(56) References Cited

U.S. PATENT DOCUMENTS

| 3,673,657 A | | 7/1972 | Gustafson et al. |
| 4,938,639 A | * | 7/1990 | Lockard ..................... 407/103 |
| 5,685,670 A | | 11/1997 | Satran |
| 5,944,457 A | * | 8/1999 | Tjernstrom ................. 407/105 |
| 6,053,672 A | | 4/2000 | Satran et al. |
| 6,126,366 A | | 10/2000 | Lundblad |
| 6,146,062 A | * | 11/2000 | Jansson ..................... 407/107 |
| 6,244,790 B1 | | 6/2001 | Kingdom et al. |
| 6,270,294 B1 | | 8/2001 | Sjöö et al. |
| 6,394,709 B1 | * | 5/2002 | Sjoo et al. ..................... 407/2 |

FOREIGN PATENT DOCUMENTS

| GB | 1 284 435 | 8/1972 |
| GB | 1 406 064 | 9/1975 |
| WO | WO 00/45981 | 8/2000 |

\* cited by examiner

Primary Examiner—Willmon Fridie, Jr.
(74) Attorney, Agent, or Firm—Burns, Doane, Swecker & Mathis, LLP

(57) ABSTRACT

A tool includes a holder body having a pocket which has a bottom surface and at least one upstanding support surface. A cutting insert is provided in the pocket, the cutting insert having a side surface structure. The support surface is provided with a cavity which contains a rounded member (e.g., a cylindrical pin). The rounded member is stationarily mounted in the cavity, and a portion of a convexly rounded outer surface of the rounded member protrudes past the cavity and into the pocket. A securing element is attached to the holder to force a side surface of the insert against the convexly rounded surface.

19 Claims, 5 Drawing Sheets

US 6,702,528 B2

INSERT HOLDER HAVING CONVEXLY CURVED SURFACE FOR SUPPORTING A CUTTING INSERT

This application claims priority of under 35 U.S.C. § 119 to Patent Application Serial No. 0104427-0 filed in Sweden on Dec. 21, 2001, the entire content of which is hereby incorporated by reference.

BACKGROUND OF THE INVENTION

The present invention relates to a tool and a holder for chip removal, wherein a cutting insert is clamped in a pocket of the holder.

TECHNICAL STANDPOINT

A known turning tool comprises a holder 1 and a turning insert 2, see FIG. 3. The holder has a pocket whereto the cutting insert is screwed or clamped. The pocket has one or more walls 3 against which an edge surface 4 of the cutting insert will abut in the screwed/clamped position.

A drawback of the known tool is that plastic deformation of the wall 3 may arise during cutting. Another drawback consists in that the cutting insert will become unstable in the holder. The latter problem is especially accentuated at thread turning tools. A tool for turning is shown in British Patent 1,406,064.

OBJECTS OF THE INVENTION

One object of the present invention is to provide a tool and a holder for turning, which avoids the drawbacks of prior art.

Another object of the present invention is to provide a tool, which comprises a durable support surface.

Another object of the present invention is to provide a tool, wherein the cutting insert is held rigidly in the holder.

Still another object of the present invention is to provide a tool, wherein the tool has a long life span.

Still another object of the present invention is to provide a tool where the pocket always comprises a stationary and well-defined line of contact in relation to the cutting insert.

SUMMARY OF THE INVENTION

These and other objects have been achieved by a tool for chip removing machining which comprises a holder, a cutting insert, and an insert-securing device. The holder includes a pocket having a bottom surface. A member is stationarily mounted to the body and includes a convexly curved surface formed of a material harder than that of the holder and spaced from the bottom surface. The cutting insert is disposed in the pocket and includes upper and lower sides interconnected by a side surface structure. The clamp is attached to the holder and engages the insert to force the side surface structure against the convexly curved surface of the member.

The invention also pertains to a holder assembly per se.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DESCRIPTION OF PREFERRED EMBODIMENTS OF THE INVENTION

Figure 1D:
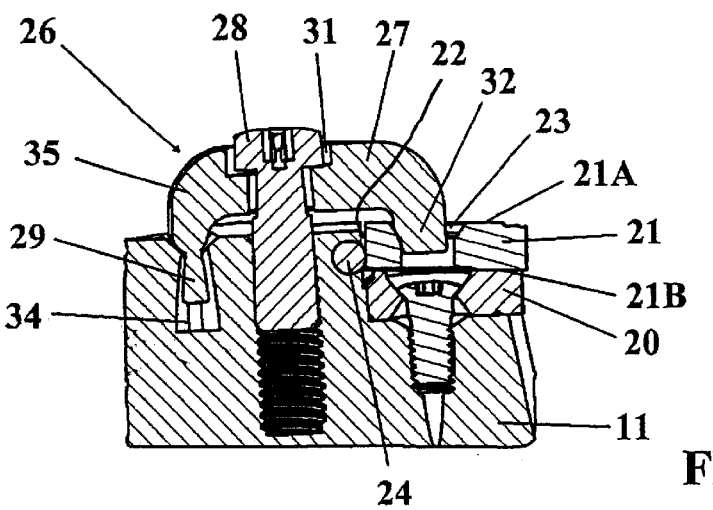
FIG. 1D shows the tool in a cross-section according to line D—D in FIG. 1A.
Figure 1A:
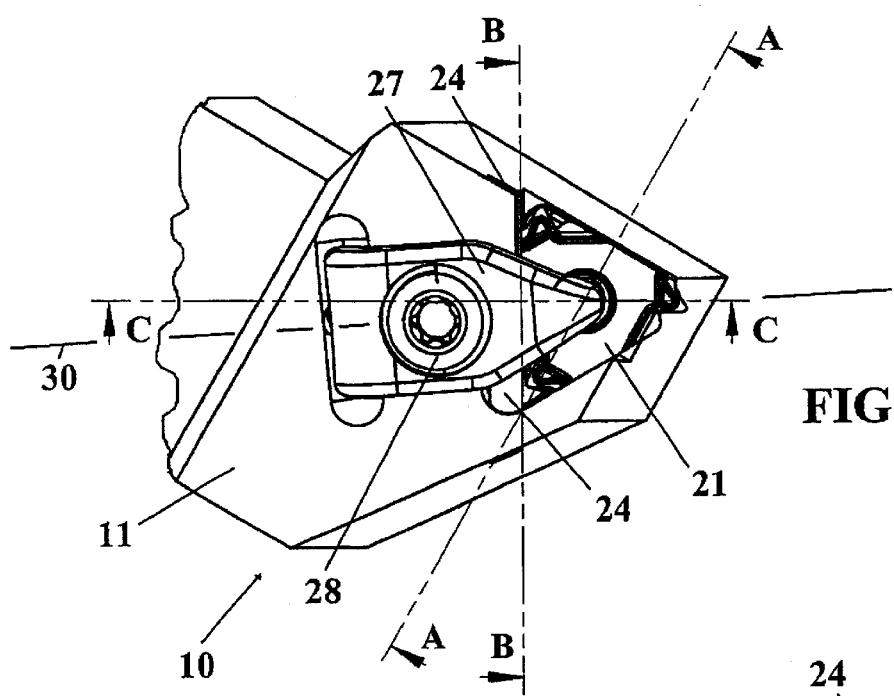
FIG. 1A shows a top perspective view of a thread-cutting tool according to the present invention.
Figure 1B:
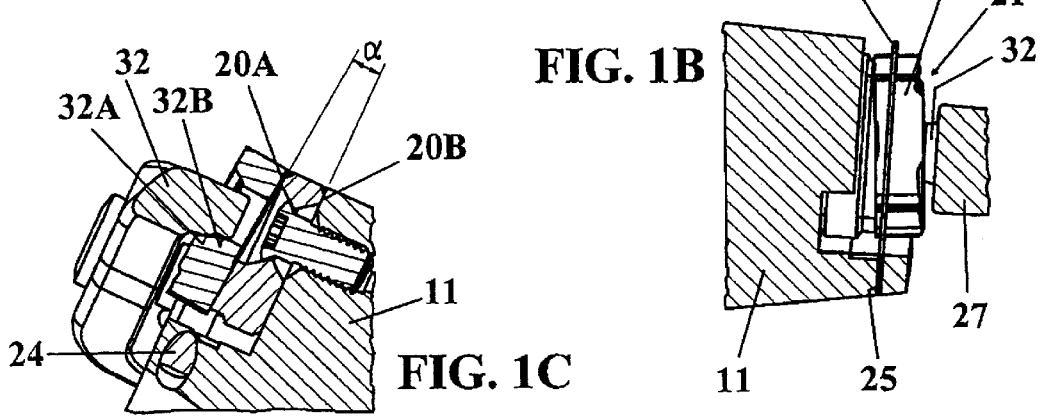
FIG. 1B shows the tool in a cross-section according to line B—B in FIG. 1A.
Figure 1C:
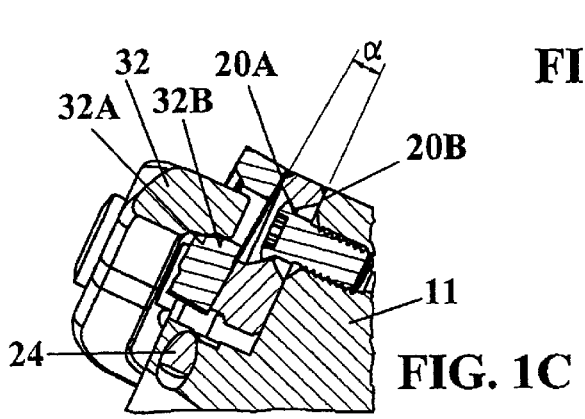
FIG. 1C shows the tool in a cross-section according to line C—C in FIG. 1A.

The tool 10 according to the present invention, see FIGS. 1A–1E and FIGS. 2A and 2B, preferably comprises a cutting insert holder 11 intended for thread turning which in its forward end terminates in a pointed portion (see FIG. 1A). However, it will be appreciated that the present invention is applicable to virtually all type of turning inserts. The holder includes a body forming a pocket 12 with two relatively angled upright surfaces 13, 14 and a bottom surface 15. The surfaces 13, 14 form an acute angle with each other when they are seen in a top view (see FIG. 2A), such that a cutting insert shall be able to be clamped toward these surfaces. The bottom surface 15 is provided in a plane P. In an alternative, there could be provided a profiled bottom surface, such as a surface provided with grooves, see FIG. 4A, or bumps, said plane being defined by at least two peaks of the bottom surface.

The bottom surface 15 includes a second orifice of a threaded blind hole 16 formed in the holder. The body of the holder 11 A has a shank 17. A second threaded blind hole 18 is provided in the vicinity of the pocket 12 but spaced therefrom in a direction F towards the shank. The hole 18 is followed by a groove-shaped recess 19 provided still farther away in direction F towards the shank.

The surface 14 is provided with a pin 24, which is provided in or inserted into a cavity 25 that communicates with the surface 14. The pin has a convexly curved outer peripheral surface formed by any of a large number of shapes, e.g., cylindrical. It is also conceivable to develop a pin profiled like a dumbbell with a waistline so as to form two abutment lines/points between the pin and the cutting insert. The pin 24 is made of a material, such as hardened steel or cemented carbide, having higher hardness than the material of the holder body.

The cavity 25 is a boring, which extends parallel to the surface 14. The cavity 25 breaks through or intersects the surface 14, and a small portion of the outer periphery of the pin 24 projects through the cavity 25 and thus extends past the surface 14 and into the pocket in a direction towards the edge surface 22 of the cutting insert. The pin projects a distance X, (see FIG. 1E) which is at most 40% of the diameter D of the pin. The pin 24 is spaced in the height direction from the bottom surface 15, by spacing the bottom portion 24A of the pin 24 (which faces towards the bottom surface 15) at a perpendicular distance Y from the plane P of the bottom surface. The distance Y is greater than 50% of the depth Z of the pocket. A distance S from the bottom 15 of the pocket to a line of contact between the pin periphery 24 and the cutting insert is greater than the thickness T of a shim 20 on which the insert rests. The greater the distance Y, the smaller the risk that the active cutting corner of the cutting insert will be lifted from the support during mounting. This, in turn, ensures that the life spans of the holder and the cutting insert, respectively, become longer.

Figure 1E:
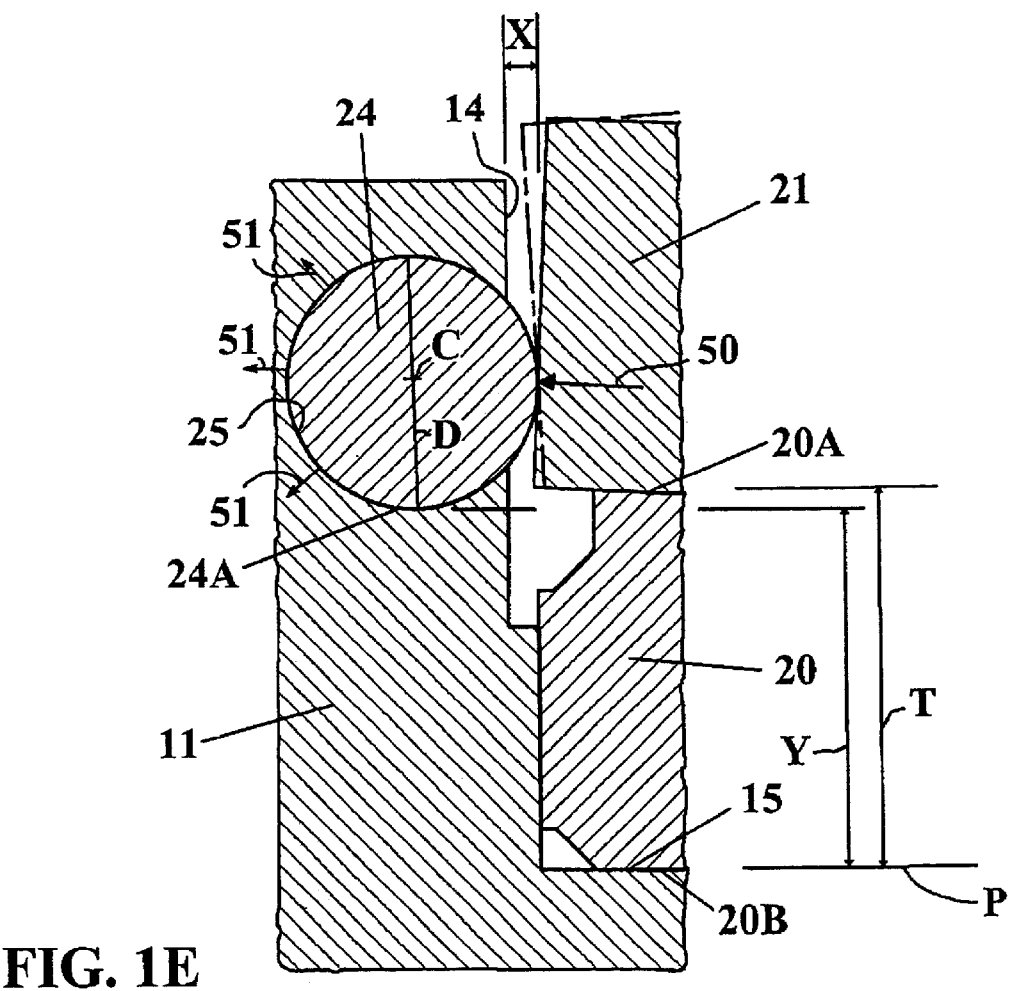
FIG. 1E shows an enlarged view of the tool according to FIG. 1D.

The pin may be inserted into the cavity 25 with press fit and/or by deforming material of the holder around the pin. An arrow 50 in FIG. 1E illustrates the force acting against a line of contact between the pin and the edge surface 22 of the cutting insert during a cutting operation, the line contact being parallel to the bottom surface 15. The force is transferred by means of the pin 24 to the holder 11 along about 180° of the pin circumference, as is illustrated by the arrows 51, such that the surface pressure on the basic material of the holder becomes relatively low. In the ideal case the forces are consequently transferred by means of the pin from a line abutment, at 50, to a surface abutment, at 51. The dotted lines in FIG. 1E depict the cutting insert with a shim with another angle, wherein the line of contact has substantially the same position.

The tool 10 frequently comprises a shim 20, with a certain adaptation angle α (see FIG. 1C), which is defined between the respective planes of the shim's 20 upper side 20A and lower side 20B. The angle α is adapted such that the tool gives the thread the correct pitch angle. The shim 20 is provided to be forced in a known manner against the bottom surface 15 by means of a fastening screw in cooperation with the recess 16. A threading insert 21 is intended to abut against the shim 20 in the pocket 12. The cutting insert 21 preferably has a triangular basic shape and side surfaces 22, which connect to the largest sides of the cutting insert, i.e. the upper side 21A and the lower side 21B. The cutting insert is provided with corners the geometries of which are provided for thread turning of some thread form. The cutting insert 21 preferably has a center hole 23. The pocket may alternatively be provided for other polygonal or round cutting inserts.

A securing device such as a clamping assembly 26 is provided to firmly clamp the cutting insert 21 in the pocket 12, which assembly comprises a lever or clamp 27, a screw 28 and a positioning peg 29. Alternatively, the securing device may comprise a single screw which extends through the center hole 23 of the cutting insert.

The clamp 27 has, in a top view (FIG. 1A), substantially the shape of an oblong wedge. The clamp has a longitudinal axis 30 and a relatively central hole 31. The clamp is maneuvered by means of the screw 28 screwed into the recess 18 in the cutting insert holder 11. The center axis of the recess 18 is parallel with the threaded hole in the pocket. The clamp has a forward end with a first protrusion 32 having a first surface 32A intended to abut against the wider upper portion of the threaded hole 23 and a second surface 32B intended to abut against the cylindrical lower portion of the threaded hole 23. Said surfaces 32A and 32B are spaced by a concave portion. The protrusion may alternatively have a conventional substantially conical design.

Figure 2B:
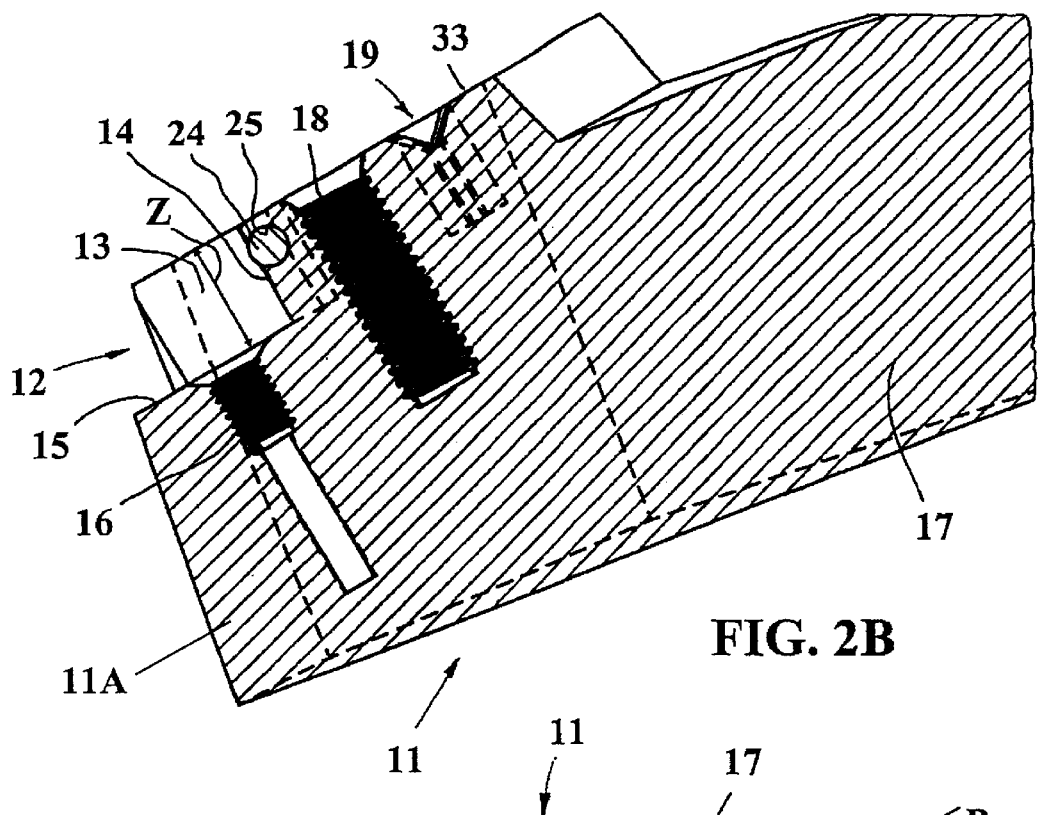
FIG. 2B shows the holder in a cross-section according to line B—B in FIG. 2A.
Figure 2A:
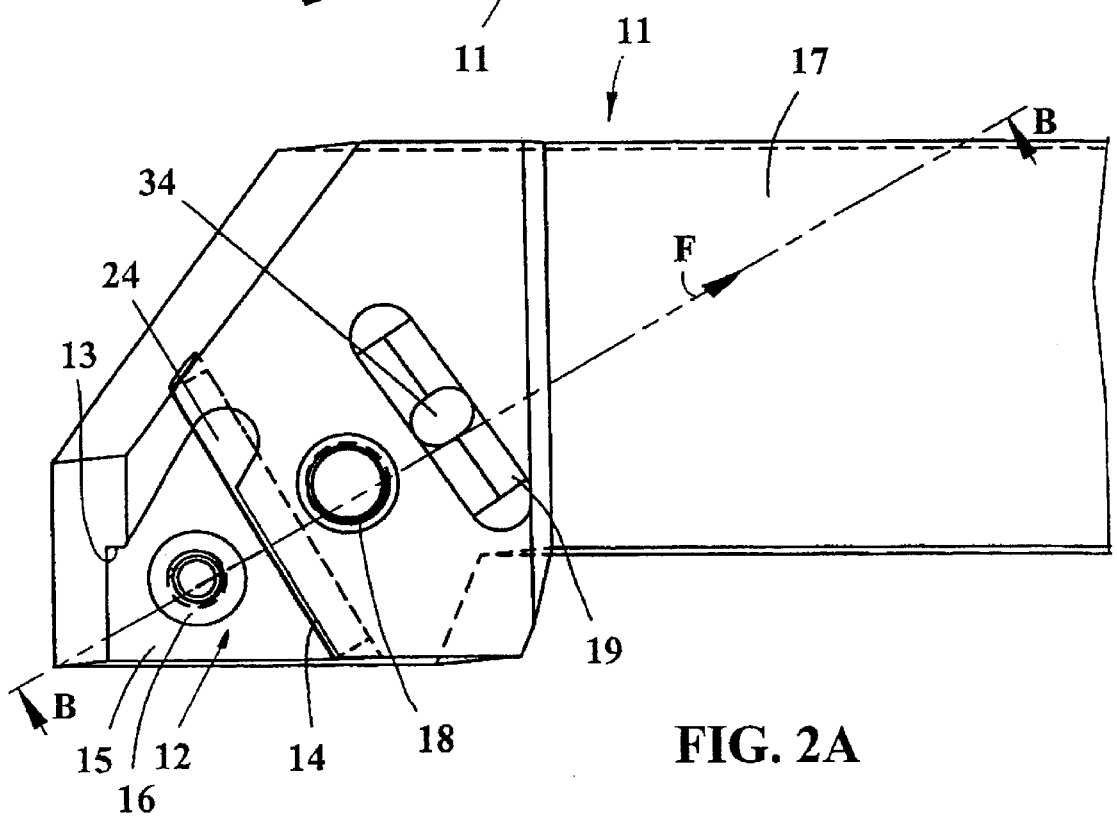
FIG. 2A shows the holder of FIG. 1A according to the present invention in plan view.

The groove-shaped recess 19 in the holder, see FIG. 2B, comprises two downwardly converging, and substantially perpendicular first and second surfaces. Said surfaces are provided substantially perpendicular to the longitudinal axis 30 of the clamp. The first surface forms an angle of about 30–60° with an upper side 33 of the holder. A boring 34 extends substantially in the middle of the recess 19 relative to the lateral direction of the clamp. The boring 34 is intended to receive the positioning peg 29, integrated at the rear end of the clamp. The peg 29 is intended to guide the clamp during mounting via the boring 34.

The other end of the clamp facing away from the protrusion 32 comprises a second protrusion 35. The end of the protrusion 35 facing away from the holder comprises two relatively sloping first and second surfaces. Said surfaces extend perpendicularly to the longitudinal axis 30 of the clamp. The first surface and the second surface are somewhat domed but generally form an angle of about 45° with an upper side 33 of the holder. The protrusion 35 has a rear surface to which positioning peg 29 has been connected.

The tool is mounted as follows. The shim 20 is placed against the bottom surface 15 of the pocket 12 such that a screw may be moved through a hole in the shim and be threaded firmly into the first recess 16. Thereby, the shim is secured to the pocket 12. Subsequently, the screw 28 is brought through the hole 31 in the clamp, whereafter the peg 29 of the clamp is aligned with the boring 34 and the screw 28 is aligned with the recess 18. Thereby, the screw 28 can be screwed into the recess 18. Before the screw 28 is tightened, the threading insert 21 shall be placed on top of the shim 20 such that one edge surface of the cutting insert abuts against the support surface 13 and another edge surface 22 abuts against the pin 24 which thus defines another support surface. The hole 23 of the cutting insert is thereby aligned with the protrusion 32 of the clamp such that the protrusion 32 at tightening of the screw 28 is brought into the insert hole, whereby its first 32A and second 328 surfaces abut against the insert hole. Thereby the cutting insert is pressed against the surface 13 and the pin 24, and also the shim in a direction towards the bottom surface 15. The pin 24 is stationarily located in the cavity 25 contrary to conventional adjustable supports when the position of the cutting insert under certain difficulty can be varied by the operator. However, the member 24 may be exchanged after being worn out. The tool according to the present invention consequently is not intended to comprise adjustability such as when the support of the cutting insert edge surface is displaced to change the position of the cutting insert in the pocket.

From the foregoing it will be appreciated that the surface 14 does not perform an insert-supporting function, and thus could be eliminated in favor of suitable means for fixedly supporting the axial ends of the pin 24. Moreover, a similar pin H could be provided for the surface 13.

Figure 3:
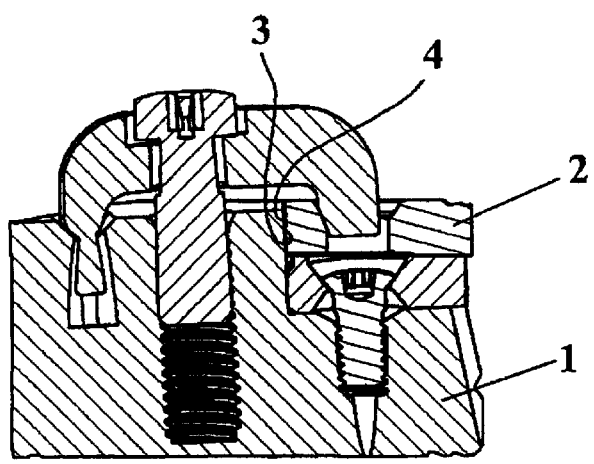
FIG. 3 shows a known thread cutting tool in a view corresponding to FIG. 1D.

If another adaptation angle α is wanted in the same holder, another shim having the desired geometry could be mounted in the pocket 12. In conventional holders, see FIG. 3, with entirely planar support surfaces, the edge or the intersection between the lower side of the cutting insert and the edge surface will emboss a groove in the support surface, i.e., the cutting insert deforms the pocket due to the forces that arise during cutting. Thereby, the tolerances of the holder deteriorate. Plastic deformation of the pocket is especially common when using large thread profiles on small threading inserts. Large thread profiles or large active cutting corners give smaller accessible contact surfaces on the edge surface of the cutting insert which gives a higher surface pressure against the pocket. In addition, large thread profiles give long cutting lengths, which entails relatively large cutting forces.

A spring may be provided under the clamp such to lift the clamp at loosening of the screw 28.

At indexing of the cutting insert, the screw 28 is somewhat untightened, whereby the cutting insert can be removed and indexed and again be tightened firmly against the shim, the support surface 13 and the pin 24.

In an alternative embodiment no shim is used but the depth Z' of the pocket is made smaller, whereby the bottom surface 15 is provided in a position which corresponds to the upper side 20A of the shim.

Figure 4A:
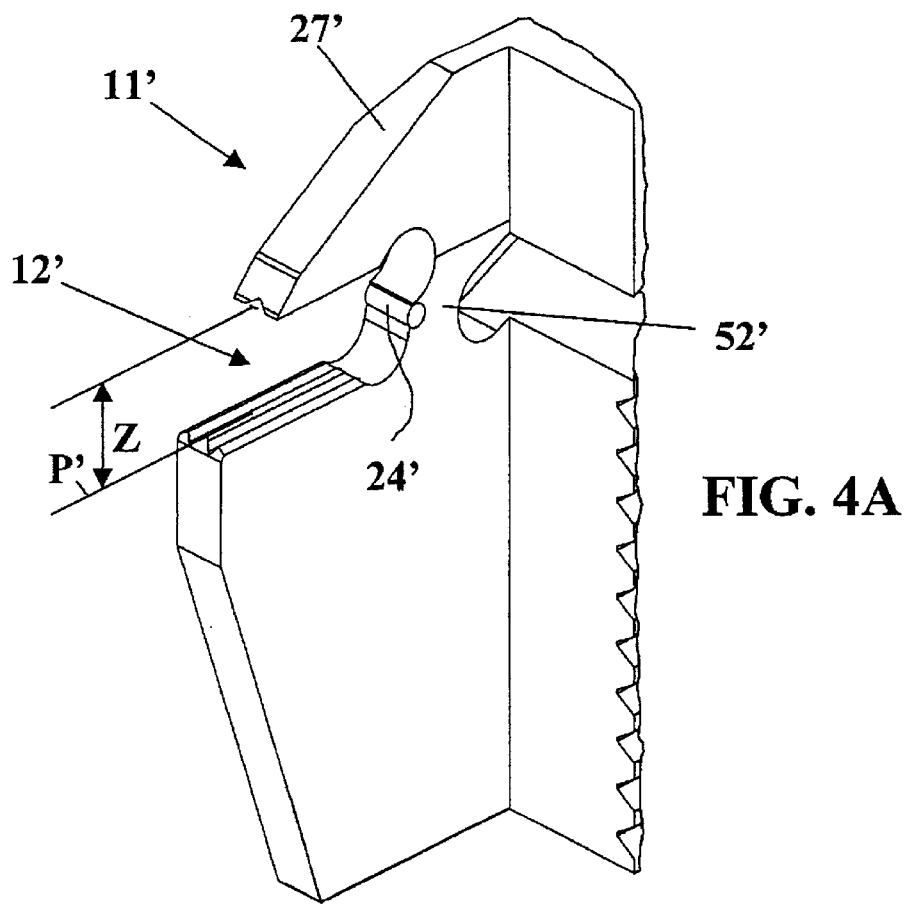
FIGS. 4A and 4B show an alternative embodiment of a holder for a turning tool according to the present invention in a perspective view and in a side view, respectively.
Figure 4B:
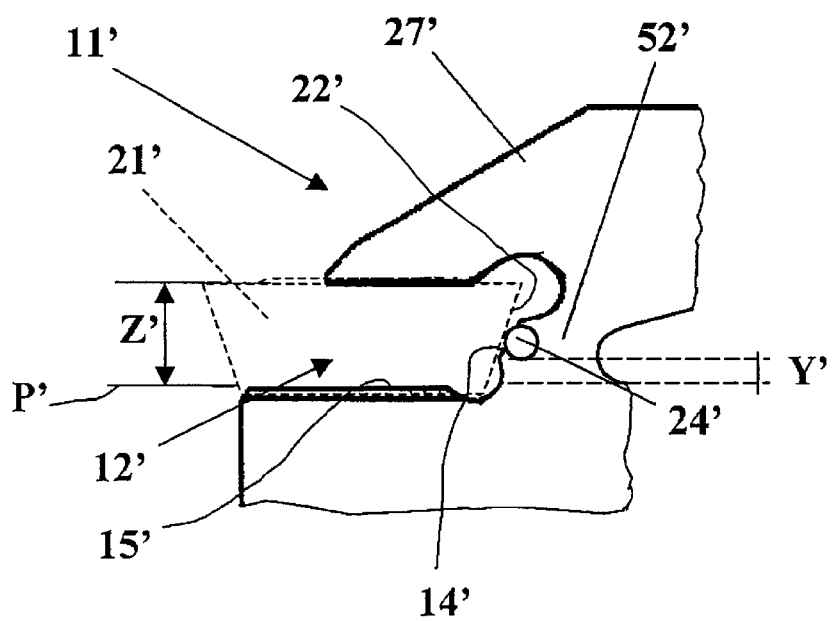

FIGS. 4A and 4B show a forward portion of an alternative embodiment of a holder 11' for a grooving tool according to the present invention in a perspective view and in a side view, respectively. The bottom surface 15' in the pocket 12' and the lower side of the cutting insert 21' are profiled as is more completely described in U.S. Pat. No. 6,244,790. The cutting insert 21' is intended to be clamped firmly in the pocket 12' by means of a clamp 27'. The clamp 27' is influenced by a wedge device, not shown, of the holder 11' such that the clamp is tilting elastically about a waistline or weak portion 52' in the holder, approximately as is described in U.S. Pat. No. 6,270,294. A pin member 24' has been provided in a surface 14' in the pocket like in the above described tool 10 at a distance Y' from the plane P' of the bottom surface. The distance S' (from the pocket bottom to the center of the pin 24'), and possibly also the distance Y' (from the pocket bottom to the bottom of the pin 24'), is greater than 10% of the depth Z' of the pocket. The member 24' is inserted in a cavity in the weak portion, which means that a knowingly weak portion is strengthened. This entails in turn that the life span of the holder and the cutting insert becomes longer. In a mounted position, the edge surface 22' of the cutting insert 21' abuts along a line of contact against the member 24'.

Figure 5A:
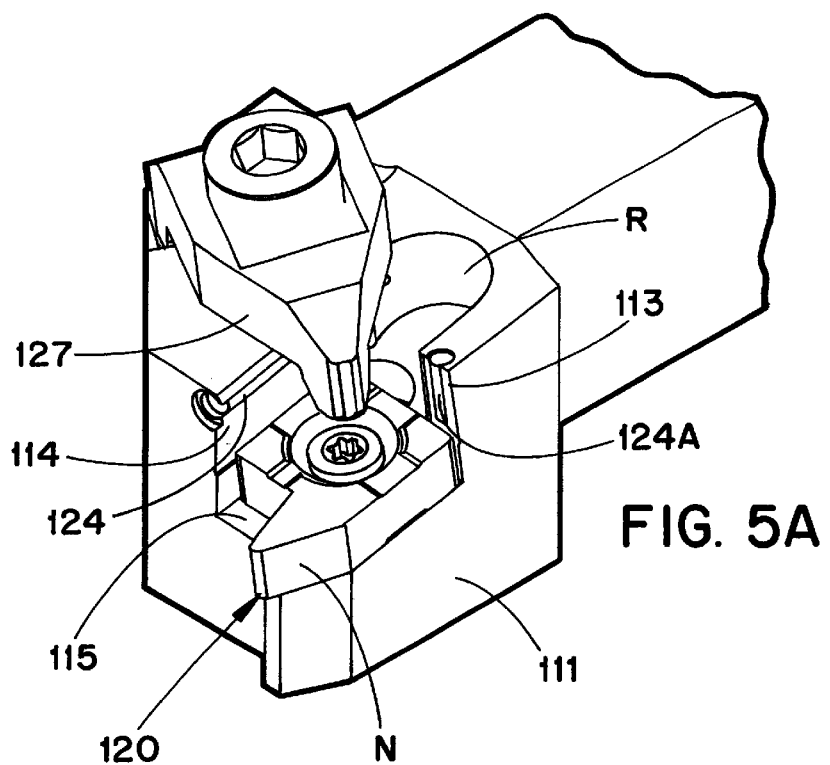
FIG. 5A is a top perspective view of still another embodiment of a holder for a turning tool according to the invention, without a cutting insert in place.
Figure 5B:
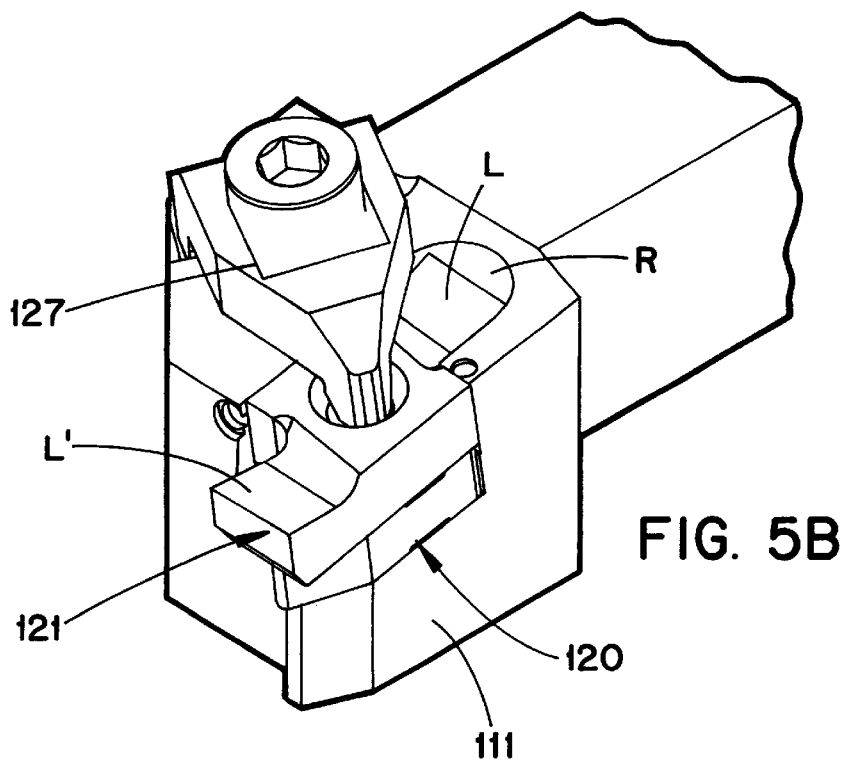
FIG. 5B is a view similar to FIG. 5A with a cutting insert in place.

Another embodiment of the invention depicted in FIGS. 5A, 5B employs a clamp 127 similar to that described earlier herein. The holder 111 employs a pin 124, similar to the earlier described pin 24, to define a first support surface. In addition, there is provided a second pin 124A having a convexly curved surface extending in a direction which is orthogonal to the first pin 124 and perpendicular to the bottom surface 115 for defining a second support surface. The pin 124A projects slightly past the surface 113 and into the pocket to make line contact with a cutting insert 121. By orienting the pin 124A upright, the surface 113 can be made narrow, whereby a wide recess R can be formed between the surfaces 113, 114. The wide recess R accommodates a first projecting leg L of the cutting insert, while a second projecting leg L' of the insert is in an active cutting position. Each leg includes a cutting edge.

The cutting insert 121 can be of various types, e.g., a type for cutting threads having a big thread profile and which is capable of only two indexings. Alternatively, the insert could be a grooving insert.

The insert 121 is shown as used with a shim 120 having a long nose N that underlies the active leg L' of the insert. Alternatively, the shim can be omitted and the holder itself formed with the nose.

The present invention consequently relates to a tool and a holder for turning, wherein the pocket always comprises a stationary and well-defined line of contact in relation to the cutting insert. This enables lengthy use of one and the same holder for a lot of different shims having different geometries. The invention is intended foremost for turning but alternative machining methods and cutting inserts can with advantage improve performance with the assistance of member 24 and its stationary location in a holder. Repair of worn holders is simplified also since the member 24 can be replaced by a new member which is stationarily mounted in the cavity 25 of the holder.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for chip removing machining, comprising:
   a holder including a body defining a pocket having a bottom surface, and a member having a convexly curved surface extending along an edge of the bottom surface at a distance thereabove, the member being stationarily mounted to the body and formed of a harder material than the body;
   a cutting insert disposed in the pocket and including upper and lower sides interconnected by a side surface structure; and
   a securing device attached to the body and engaging the insert to force the side surface structure into substantial line contact with the convexly curved surface.

2. The tool according to claim 1 wherein the member comprises a cylindrical pin.

3. The tool according to claim 1 wherein the member constitutes a first member and the convexly curved surface thereof extends substantially parallel to the bottom surface, the tool further including a second member spaced from the first member, the second member including a convexly curved surface extending substantially perpendicularly to the bottom surface, the second member being stationarily mounted to the body and formed of a harder material than the body; the cutting insert making line contact with the convexly curved surfaces of both of the first and second members.

4. The tool according to claim 3 wherein a recess is formed in the body between the first and second convexly curved surfaces; the cutting insert including first and second identical projecting legs extending in generally opposite directions, each leg having a cutting edge; the first leg disposed in the recess and the second leg disposed in an active cutting position.

5. The tool according to claim 1, further including a shim disposed on the bottom surface; the insert seated on the shim, the bottom surface lying in a plane; the member spaced from the bottom surface in a direction perpendicularly thereto by a distance greater than a thickness of the shim.

6. The tool according to claim 1 wherein the member is spaced from a plane of the bottom surface by a distance greater than 50 percent of a depth of the pocket.

7. The tool according to claim 1 wherein the member comprises a cylindrical pin.

8. The tool according to claim 7 wherein the curved surface of the pin protrudes from the support surface by a distance no greater than 40 percent of a diameter of the pin.

9. The tool according to claim 1 further including a shim having a lower side disposed on the bottom surface of the pocket and an upper side on which the insert is seated; the upper and lower sides being non-parallel to one another.

10. A holder assembly adapted to mount a cutting insert, comprising a holder body and an insert-securing device; the holder body including a body forming a pocket having a bottom surface and an upright surface upstanding from the bottom surface, the upright surface having a cavity formed therein, a substantially solid member stationarily disposed in the cavity and including a curved surface formed of a harder material than that of the holder body and protruding past the cavity and into the pocket at a location spaced from the bottom surface.

11. The holder assembly according to claim 10 further including a shim disposed on the bottom surface; the insert seated on the shim, the bottom surface lying in a plane; the member spaced from the bottom surface in a direction perpendicularly thereto by a distance greater than a thickness of the shim.

12. The holder assembly according to claim 10 wherein the member is spaced from a plane of the bottom surface by a distance greater than 50 percent of a depth of the pocket.

13. The holder according to claim 10 wherein the cavity comprises a bore extending parallel to the support surface and the member comprises a cylindrical pin.

14. The holder according to claim 13 wherein the curved surface of the pin protrudes from the support surface by a distance no greater than 40 percent of a diameter of the pin.

15. A tool for chip removing machining, comprising:
 a holder including a body forming a pocket having a bottom surface and an upright surface upstanding from the bottom surface, the upright surface having a cavity formed therein, a substantially solid member stationarily disposed in the cavity and including a convexly curved surface formed of a material harder than that of the body and protruding past the cavity and into the pocket at a location spaced from the bottom surface;
 a cutting insert disposed in the pocket and including upper and lower sides interconnected by a side surface structure; and
 a securing device attached to the body and engaging the insert to force the side surface structure against the curved surface of the member.

16. The tool according to claim 15 wherein the upright surface constitutes a first upright surface; the body including a second upright surface extending at an angle relative to the first upright surface; the securing device arranged to force the side surface structure of the insert also against the second upright surface.

17. The tool according to claim 15 wherein the cavity comprises a bore extending parallel to the upright surface, the member comprising a cylindrical pin.

18. The tool according to claim 15 wherein the upright surface constitutes a first upright surface; the body including a second upright support surface extending at an angle relative to the first upright surface and having a cavity formed therein; the member constitutes a first member and the convexly curved surface thereof extends substantially parallel to the bottom surface; the tool further including a second member disposed in the cavity of the second upright surface, the second member including a convexly curved surface extending substantially perpendicularly to the bottom surface, the second member being stationarily mounted to the body and formed of a harder material than the body and projecting through the second upright surface, the cutting insert making line contact with the convexly curved surfaces of both of the first and second members.

19. The tool according to claim 18 wherein a recess is formed in the body between the first and second convexly curved surfaces; the cutting insert including first and second identical projecting legs extending in generally opposite directions, each leg having a cutting edge; the first leg disposed in the recess and the second leg disposed in an active cutting position.

* * * * *